United States Patent
Li et al.

(10) Patent No.: US 12,535,257 B2
(45) Date of Patent: Jan. 27, 2026

(54) REFRIGERATOR WITH FREEZING STORAGE ASSEMBLY

(71) Applicants: QINGDAO HAIER REFRIGERATOR CO., LTD., Qingdao (CN); HAIER SMART HOME CO., LTD., Qingdao (CN)

(72) Inventors: Mengcheng Li, Qingdao (CN); Bin Fei, Qingdao (CN); Haoquan Liu, Qingdao (CN); Bintang Zhao, Qingdao (CN); Jiyun Wang, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 287 days.

(21) Appl. No.: 18/270,458

(22) PCT Filed: Nov. 15, 2021

(86) PCT No.: PCT/CN2021/130607
§ 371 (c)(1),
(2) Date: Jun. 29, 2023

(87) PCT Pub. No.: WO2022/142777
PCT Pub. Date: Jul. 7, 2022

(65) Prior Publication Data
US 2024/0060703 A1 Feb. 22, 2024

(30) Foreign Application Priority Data
Dec. 31, 2020 (CN) ......................... 202011640487.1

(51) Int. Cl.
*F25D 21/04* (2006.01)
*A23B 2/80* (2025.01)
(Continued)

(52) U.S. Cl.
CPC .............. *F25D 21/04* (2013.01); *A23B 2/805* (2025.01); *F25D 11/02* (2013.01); *F25D 25/005* (2013.01)

(58) Field of Classification Search
CPC ........ F25D 21/04; F25D 11/02; F25D 25/005; F25D 17/042; F25D 23/12;
(Continued)

(56) References Cited

U.S. PATENT DOCUMENTS 6,250,087 B1    6/2001   Owada et al.

FOREIGN PATENT DOCUMENTS

| CN | 205262026 U | 5/2016 |
|---|---|---|
| CN | 106839581 A | 6/2017 |

(Continued)

OTHER PUBLICATIONS

CN 107965960 B Translation (Year: 2019).*
CN 110108076 A Translation (Year: 2019).*
CN 207422749 U Translation (Year: 2018).*

*Primary Examiner* — Jerry-Daryl Fletcher
*Assistant Examiner* — Dario Antonio Deleon
(74) *Attorney, Agent, or Firm* — MUNCY, GEISSLER, OLDS & LOWE, P.C.

(57) ABSTRACT

A refrigerator with a freezing storage assembly, comprising: a cabinet provided therein with a storage compartment for achieving a freezing storage function; the freezing storage assembly arranged in the storage compartment and comprising: a magnetic frame made of a magnetic material; and a storage box provided in a space enclosed by the magnetic frame and defining a freezing storage space; and a plurality of groups of electromagnetic coils arranged on an inner surface of the magnetic frame and configured to form magnetic fields with magnetic pole directions at a set angle in the freezing storage space, the magnetic fields passing through the magnetic frame to complete closed loops of magnetic lines.

9 Claims, 6 Drawing Sheets

(51) Int. Cl.
*F25D 11/02* (2006.01)
*F25D 25/00* (2006.01)

(58) Field of Classification Search
CPC ......... F25D 2317/061; F25D 2700/122; F25D 29/005; F25D 17/065; A23B 2/805; A23B 2/80
See application file for complete search history.

(56) References Cited

FOREIGN PATENT DOCUMENTS

| | | | | | |
|---|---|---|---|---|---|
| CN | 107965960 | A | | 4/2018 | |
| CN | 207422749 | U | * | 5/2018 | .............. F25D 11/00 |
| CN | 108662832 | A | | 10/2018 | |
| CN | 208579558 | U | | 3/2019 | |
| CN | 110074310 | A | | 8/2019 | |
| CN | 110108076 | A | * | 8/2019 | .............. F25B 21/00 |
| CN | 107965960 | B | * | 11/2019 | .............. F25D 11/00 |
| CN | 209893782 | U | | 1/2020 | |
| CN | 111043826 | A | | 4/2020 | |
| CN | 111043828 | A | | 4/2020 | |
| CN | 111043829 | A | | 4/2020 | |
| CN | 111536748 | A | | 8/2020 | |
| CN | 214536999 | U | | 10/2021 | |
| JP | 2002-333250 | A | | 11/2002 | |
| JP | 2004-44890 | A | | 2/2004 | |
| WO | 03/038355 | A1 | | 5/2003 | |

* cited by examiner

REFRIGERATOR WITH FREEZING STORAGE ASSEMBLY

CROSS REFERENCE TO RELATED APPLICATIONS

The present invention is a 35 U.S.C. § 371 National Phase conversion of International (PCT) Patent Application No. PCT/CN2021/130607, filed on Nov. 15, 2021, which claims benefit of Chinese Application No. 202011640487.1, filed on Dec. 31, 2020, the disclosure of which is incorporated by reference herein. The PCT International Patent Application was filed and published in Chinese.

TECHNICAL FIELD

The present invention relates to a refrigerating and freezing storage device, and in particular, to a refrigerator with a freezing storage assembly.

BACKGROUND

Users pay more and more attention to a freshness retaining effect of stored food, and most freshness retaining storage in a prior art focuses on refrigerating freshness retaining and neglects freezing freshness retaining. However, food materials required to be frozen, such as meat, fish and shrimp, often have problems of a poor taste and a dark color caused by water loss after frozen, and particularly, some high-grade food materials required to be frozen have greatly reduced quality after frozen, which also influences use experience of the users.

In order to improve freezing storage quality, many improvement solutions emerge in the prior art; for example, a freezing speed of food is increased by quick freezing or the food gets into a supercooled state, which requires an increase of a refrigerating capacity of a refrigerator and also results in increased energy consumption of the refrigerator. Therefore, realization of a more efficient improvement of the freezing storage quality becomes a technical problem to be solved urgently by refrigerator researchers.

After theoretical studies, magnetic fields are found to have a greater influence on formation of ice crystals in the freezing process. Introduction of the magnetic field into freezing freshness retaining is also actively searched in the field of refrigerators; however, a freezing assisting effect of the magnetic field is not satisfactory in practical use in the refrigerator.

SUMMARY

An object of the present invention is to provide a freezing control method of a refrigerator and the refrigerator, which effectively improve freezing storage quality.

A further object of the present invention is to reduce energy consumption of the refrigerator.

In particular, the present invention provides a refrigerator with a freezing storage assembly, including:
  a cabinet provided therein with a storage compartment for achieving a freezing storage function;
  the freezing storage assembly arranged in the storage compartment and including: a magnetic frame made of a magnetic material; and a storage box provided in a space enclosed by the magnetic frame and defining a freezing storage space; and
  a plurality of groups of electromagnetic coils arranged on an inner surface of the magnetic frame and configured to form magnetic fields with magnetic pole directions at a set angle in the freezing storage space, the magnetic fields passing through the magnetic frame to complete closed loops of magnetic lines.

Optionally, the magnetic frame is configured as a square cylinder having a through opening in a front-rear direction, and the plurality of groups of electromagnetic coils include: a longitudinal magnetic field coil group configured to form a magnetic field with the magnetic pole direction parallel to a longitudinal direction of the magnetic frame; and a transverse magnetic field coil group configured to form a magnetic field with the magnetic pole direction parallel to a transverse direction of the magnetic frame; and
  the refrigerator further includes: a first power supply switch configured to control power supply of the longitudinal magnetic field coil group to be switched on or off; and a second power supply switch configured to control power supply of the transverse magnetic field coil group to be switched on or off.

Optionally, bosses are formed on inner sides of a top wall, a bottom wall, a left side wall and a right side wall of the magnetic frame respectively,
  the longitudinal magnetic field coil group includes: a first coil fitted over the boss on the inner side of the top wall of the magnetic frame, and a second coil fitted over the boss on the inner side of the bottom wall of the magnetic frame, the first coil and the second coil being connected in series or in parallel; and
  the transverse magnetic field coil group includes: a third coil fitted over the boss on the inner side of the left side wall of the magnetic frame, and a fourth coil fitted over the boss on the inner side of the right side wall of the magnetic frame, the third coil and the fourth coil being connected in series or in parallel.

Optionally, the storage box includes: an outer cylinder provided in the space enclosed by the magnetic frame and provided with a forward opening; and a drawer provided in the outer cylinder in a drawable mode.

Optionally, an air inlet and an air return port are formed in a rear wall of the outer cylinder, and the air inlet is configured to be connected with an air supply duct of the refrigerator or communicated with an evaporator of the refrigerator, so as to introduce refrigerating airflow into the storage box; the air return port is configured to be connected with an air return duct of the refrigerator or communicated with the evaporator of the refrigerator, so as to feed airflow after heat exchange back to the air return duct or the evaporator of the refrigerator.

Optionally, the refrigerator with a freezing storage assembly further includes: an opening-closing detector configured to detect an opening-closing state of the storage box; a storage temperature sensor provided in the storage box and configured to detect a temperature in the storage box; and a refrigeration controller configured to start refrigeration of the storage box under a condition that a change in the internal temperature before the storage box is opened and after the storage box is closed is greater than a first set threshold; and the first power supply switch and the second power supply switch being further configured to be alternately switched on according to a set period when the refrigeration controller starts refrigeration of the storage box, such that the longitudinal magnetic field coil group and the transverse magnetic field coil group alternately generate the magnetic field.

Optionally, in the process that the longitudinal magnetic field coil group and the transverse magnetic field coil group alternately generate the magnetic field, when the internal temperature of the storage box is lowered to be less than a second set threshold, one of the first power supply switch and the second power supply switch is switched off, and the other one of the first power supply switch and the second power supply switch is switched on periodically or continuously, such that one of the longitudinal magnetic field coil group and the transverse magnetic field coil group generates the magnetic field.

Optionally, when the internal temperature of the storage box is continuously lowered to be less than a third set threshold, the first power supply switch and the second power supply switch are both switched off, and the third set threshold is less than the second set threshold; when the internal temperature of the storage box is continuously lowered to be less than a fourth set threshold, the refrigeration controller stops refrigeration of the storage box, and the fourth set threshold is less than the third set threshold.

Optionally, after refrigeration of the storage box is stopped, the refrigeration controller is further configured to perform conventional freezing control on the storage box according to a refrigeration starting condition and a refrigeration stopping condition preset for the storage box, so as to maintain a freezing storage environment of the storage box; and the first power supply switch and the second power supply switch are further configured to allow the longitudinal magnetic field coil group and/or the transverse magnetic field coil group to generate the magnetic field according to a preset switching strategy during the conventional freezing control over the storage box by the refrigeration controller.

Optionally, the refrigerator with a freezing storage assembly further includes: a plurality of coil temperature sensors configured to detect a temperature of the longitudinal magnetic field coil group and a temperature of the transverse magnetic field coil group respectively; and in the process that the longitudinal magnetic field coil group and the transverse magnetic field coil group alternately generate the magnetic field, when the temperature of the longitudinal magnetic field coil group and/or the temperature of the transverse magnetic field coil group are/is abnormal, the first power supply switch and the second power supply switch are further configured to disconnect power supply of the magnetic field coil with the abnormal temperature.

In the refrigerator with a freezing storage assembly according to the present invention, the magnetic frame is provided on an outer side of the storage box, the plurality of groups of electromagnetic coils with the magnetic pole directions at the set angle are arranged on the inner surface of the magnetic frame, the magnetic frame guides the magnetic field generated by the electromagnetic coils, and the electromagnetic coils can form the uniform magnetic field with strength enough to meet the requirement of improving the freezing storage quality in the freezing storage space.

Further, the magnetic frame further provides an assembly structure for the electromagnetic coil, such that an occupied space is reduced, thereby improving practicability.

Still further, in the refrigerator with a freezing storage assembly according to the present invention, after an opening-closing event of the storage box, the change in the internal temperature before the storage box is opened and after the storage box is closed is acquired, whether a new food material is put in or whether the food material is required to be re-frozen is determined according to the change in the internal temperature of the storage box, and after the change in the internal temperature is determined to be greater than the first set threshold (namely under the situation that the food material is required to be frozen), refrigeration of the storage box is started, and the alternating magnetic field is generated by the plurality of groups of electromagnetic coils, such that the food material is frozen in the magnetic field environment to suppress growth of ice crystal nuclei, and therefore, a growth rate of ice crystals is higher than a migration rate of water molecules, and the generated ice crystals are small, thereby reducing damage to cells, avoiding water loss, guaranteeing a better taste of the food material, improving the freezing storage quality, and satisfying the requirement of a user for the storage quality of a precious food material. In addition, the magnetic field is generated by the plurality of groups of magnetic field coils alternately, such that directions of the magnetic field are alternated in the freezing process, thus further improving the freezing quality.

Still further, in the refrigerator with a freezing storage assembly according to the present invention, the switching condition of the electromagnetic field is improved, the magnetic field is applied during main formation of the ice crystals, a use efficiency of the magnetic field is improved, and on the one hand, influences of the magnetic field on other components outside the storage box are reduced, and on the other hand, energy consumption of the refrigerator is reduced.

The above and other objects, advantages and features of the present invention will become more apparent to those skilled in the art from the following detailed description of specific embodiments thereof taken in conjunction with the accompanying drawings.

BRIEF DESCRIPTION OF THE DRAWINGS

Some specific embodiments of the invention will be described in detail hereinafter by way of example and not by way of limitation with reference to the accompanying drawings. The same reference numerals identify the same or similar components or parts in the drawings. Those skilled in the art should appreciate that the drawings are not necessarily drawn to scale. In the drawings.

DETAILED DESCRIPTION

Figure 1:
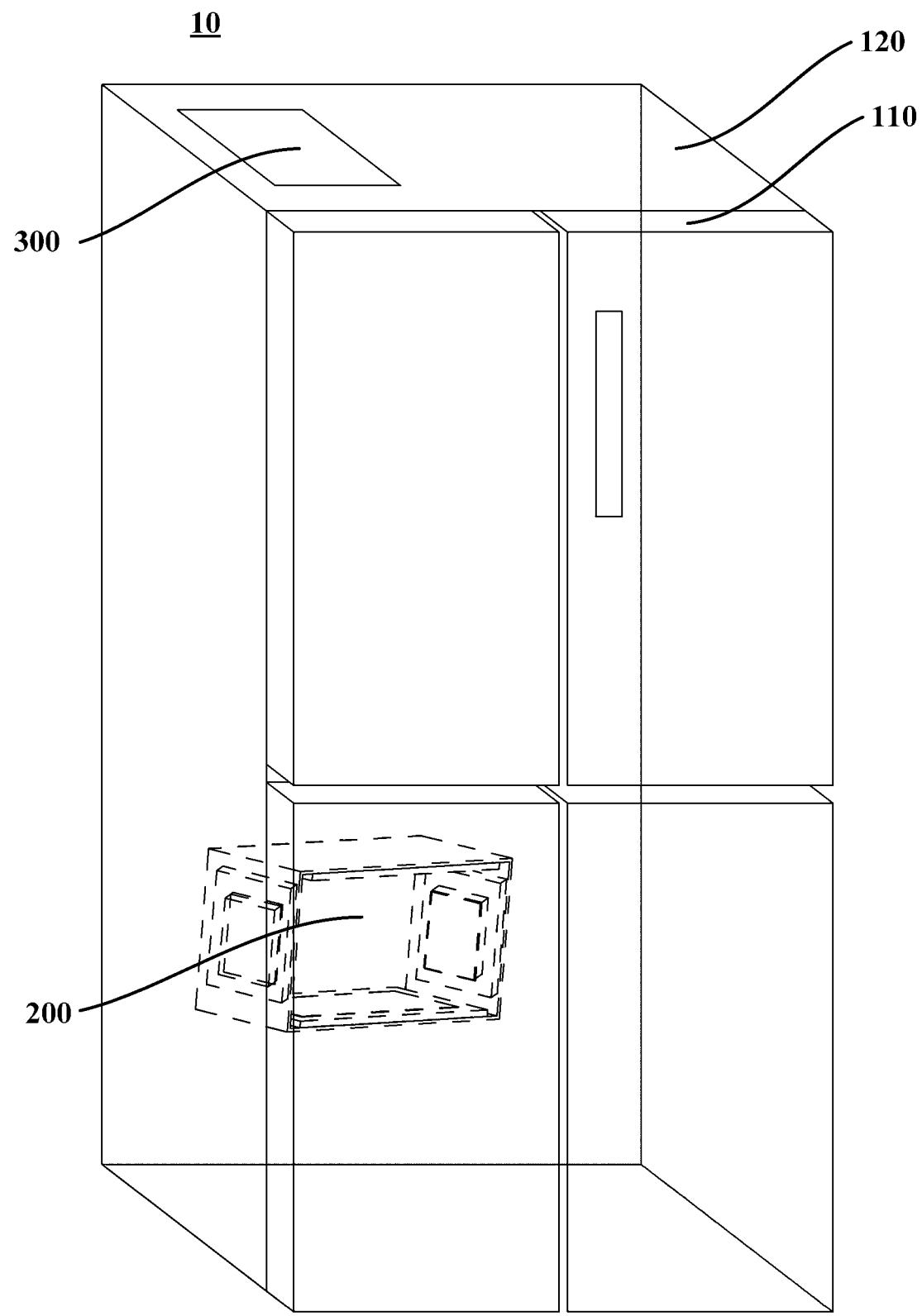
FIG. 1 is a schematic perspective diagram of a refrigerator with a freezing storage assembly according to an embodiment of the present invention.

FIG. 1 is a schematic perspective diagram of a refrigerator 10 with a freezing storage assembly according to an embodiment of the present invention. The refrigerator 10 according to the present embodiment may generally include a cabinet 120, a door 110, and a refrigeration system (not shown). The cabinet 120 may define at least one (typically plural) storage compartment with an open front side, such as a refrigerating storage compartment, a freezing storage compartment, a variable temperature storage compartment, or the like. A specific number and specific functions of the storage compartments can be configured according to predetermined requirements. The refrigerator 10 according to the present embodiment at least has a freezing storage compartment or a variable temperature storage compartment with a temperature capable of reaching a freezing range (that is, the variable temperature storage compartment can be used to realize a freezing storage environment); that is, a storage compartment for achieving a freezing storage function is provided in the cabinet 120. A temperature range for freezing storage may generally be set to −14° C. to −22° C.

The refrigerator 10 according to the present embodiment may be configured as an air-cooled refrigerator, an air path system is provided in the cabinet 120, and by a fan, refrigerating airflow subjected to heat exchange by a heat exchanger is fed to the storage compartment through an air supply port, and then returned to an air duct through an air return port. Refrigeration is realized. Since the cabinet 120, the door 110, and the refrigeration system of such a refrigerator are well known and easily implemented by those skilled in the art, in order to avoid covering and obscuring invention points of the present application, the cabinet 120, the door 110, and the refrigeration system are not repeated hereinafter.

A freezing storage assembly 200 is provided in the freezing storage compartment. The freezing storage assembly 200 forms an independent closed freezing storage space, and storage quality of the freezing storage space may be improved by means of a magnetic field. Under the action of a magnetic field with certain strength, a free path of water molecules can be limited in a freezing process, which is indicated by breakage of hydrogen bonds in water molecule clusters. Since growth of crystal nuclei is inhibited, a growth rate of ice crystals is higher than a migration rate of the water molecules, and the generated ice crystals are small, such that damage to cells is less, a water loss rate is reduced, and nutrition and a taste of a food material are well preserved. Furthermore, the magnetic field can shorten a freezing time and assist in inhibiting numbers of microorganisms and bacteria. In the refrigerator 10 according to the present embodiment, a targeted improvement is further performed on the magnetic field, and the freezing storage quality is further improved by optimizing a direction and start-stop times of the magnetic field.

Figure 2:
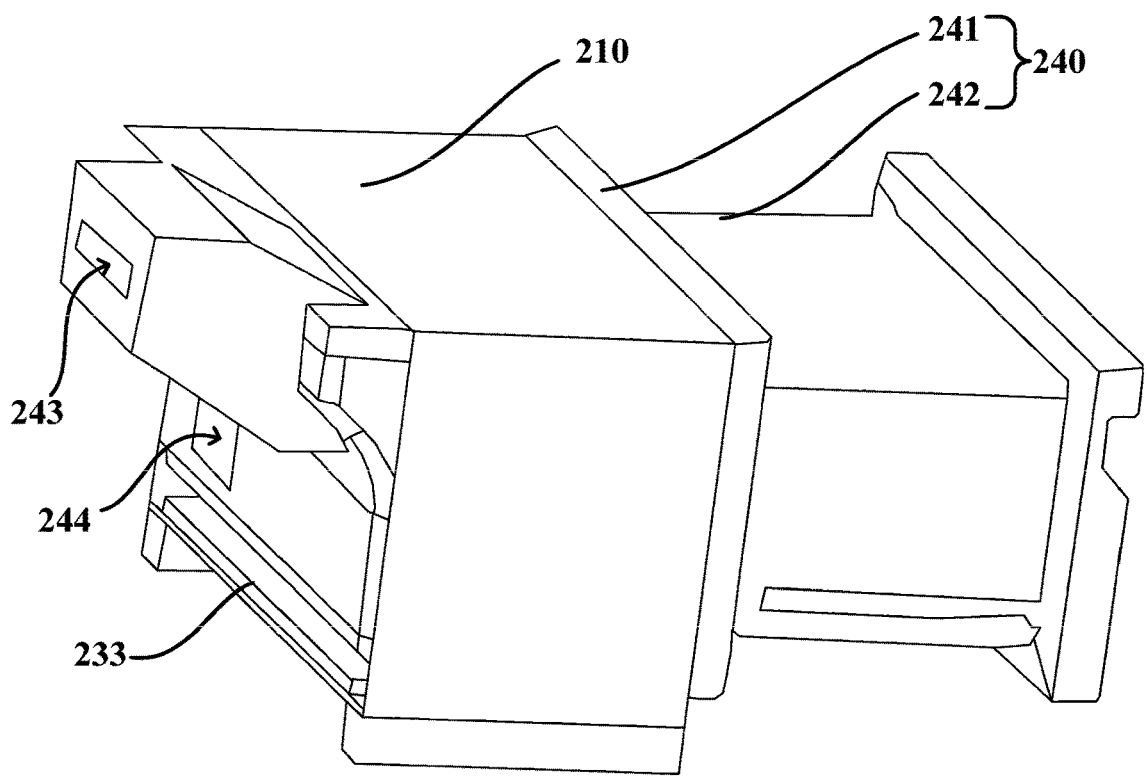
FIG. 2 is a schematic diagram of a freezing storage assembly of a refrigerator with a freezing storage assembly according to an embodiment of the present invention.
Figure 3:
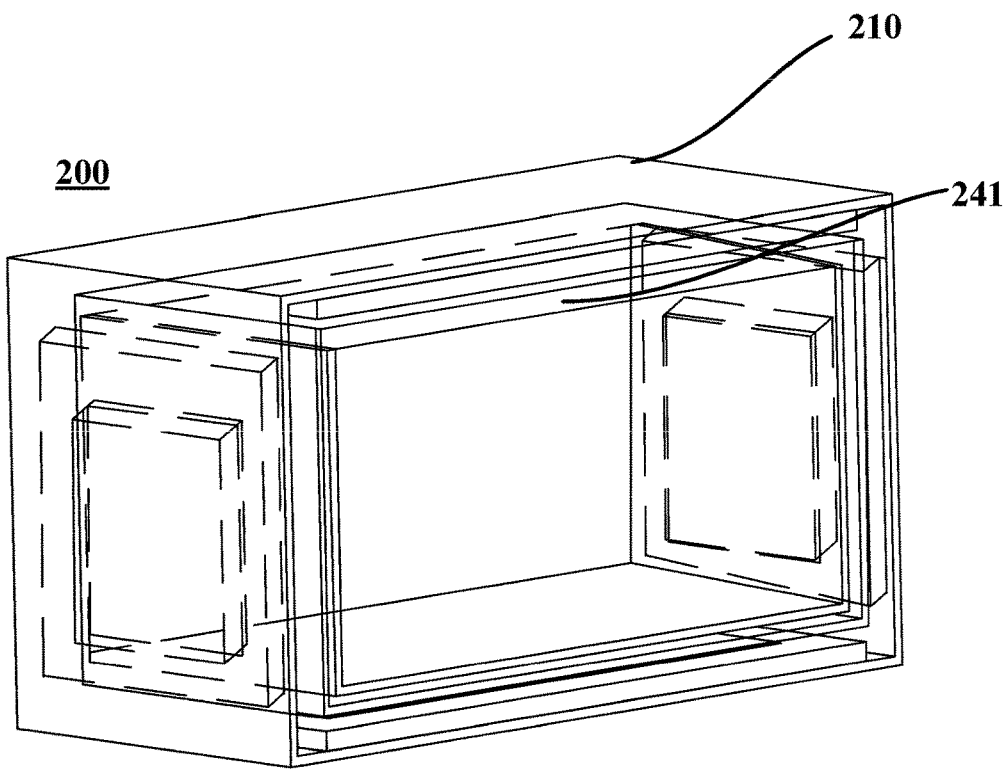
FIG. 3 is a schematic diagram of fitting of a magnetic frame and a storage box in a refrigerator with a freezing storage assembly according to an embodiment of the present invention.
Figure 4:
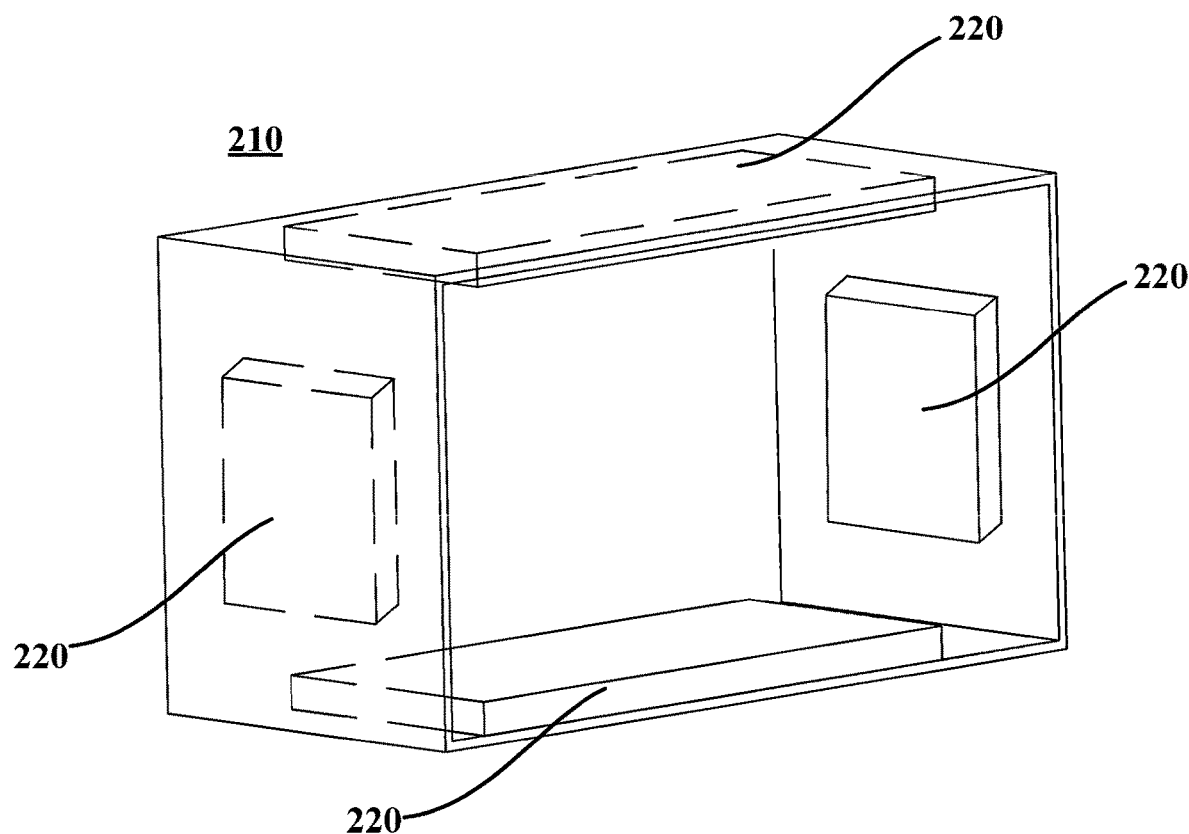
FIG. 4 is a schematic diagram of a magnetic frame in a refrigerator with a freezing storage assembly according to an embodiment of the present invention.
Figure 5:
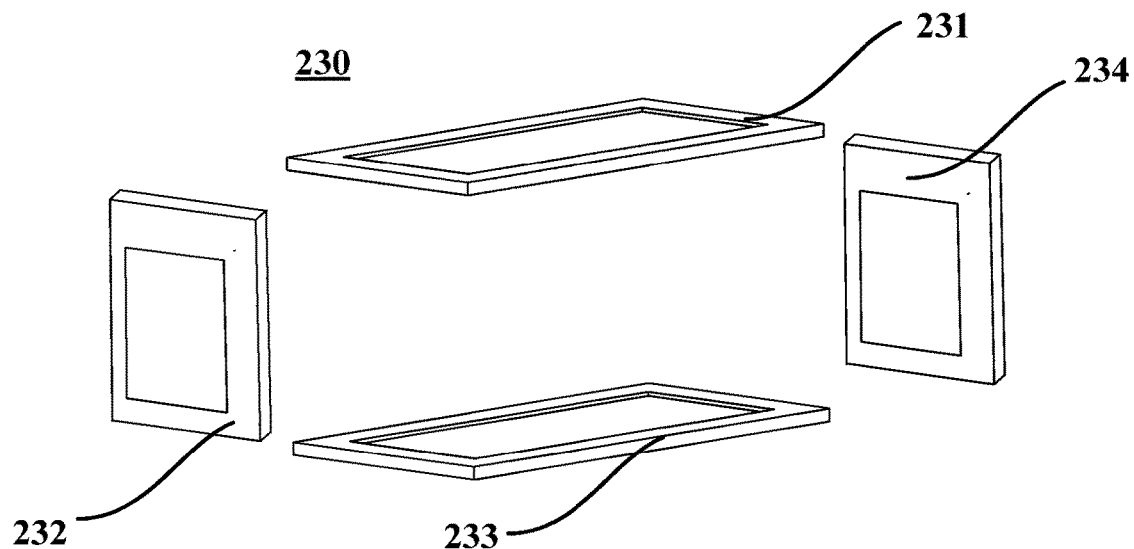
FIG. 5 is a schematic diagram of an electromagnetic coil in a refrigerator with a freezing storage assembly according to an embodiment of the present invention.

FIG. 2 is a schematic diagram of the freezing storage assembly 200 of the refrigerator 10 with a freezing storage assembly 200 according to an embodiment of the present invention; FIG. 3 is a schematic diagram of fitting of a magnetic frame 210 and a storage box 240 in the refrigerator 10 with a freezing storage assembly 200 according to an embodiment of the present invention; FIG. 4 is a schematic diagram of the magnetic frame 210 in the refrigerator 10 with a freezing storage assembly 200 according to an embodiment of the present invention; FIG. 5 is a schematic diagram of an electromagnetic coil 230 in the refrigerator 10 with a freezing storage assembly 200 according to an embodiment of the present invention.

As shown in FIGS. 2 to 5, the freezing storage assembly 200 is arranged in the storage compartment, and includes: the magnetic frame 210, a plurality of groups of electromagnetic coils 230, the storage box 240, or the like.

The magnetic frame 210 is made of a magnetic material, and bosses 220 are formed on inner walls thereof respectively. The magnetic material may be a soft magnetic material or hard magnetic material; for example, a soft magnetic material may be used and is characterized by low coercivity and high magnetic permeability, and the magnetic frame 210 may be configured to focus the magnetic field, so as to reduce outward release of the magnetic field, and reduce interference with other components outside the freezing storage assembly 200 (for example, magnetization of other components, or the like).

The plurality of groups of electromagnetic coils 230 are arranged on an inner surface of the magnetic frame 210 and configured to form magnetic fields with magnetic pole directions at a set angle in the freezing storage space, the magnetic fields passing through the magnetic frame 210 to complete closed loops of magnetic lines. The magnetic fields with the magnetic pole directions at the set angle formed by the plural groups of electromagnetic coils 230 have a better freezing storage effect, and the whole freezing storage space may be guaranteed to be within a range of the magnetic field without dead angles, such that a crystallization process of stored food is more uniform.

Two groups of electromagnetic coils 230 may be provided. The magnetic pole directions of the magnetic fields formed by the two groups of electromagnetic coils 230 may be orthogonal. For example, the plurality of groups of electromagnetic coils 230 may include a longitudinal magnetic field coil group 231, 232 and a transverse magnetic field coil group 233, 234. The longitudinal magnetic field coil group 231, 232 is configured to form a magnetic field with the magnetic pole direction parallel to a longitudinal direction of the magnetic frame 210; and the transverse magnetic field coil group 233, 234 is configured to form a magnetic field with the magnetic pole direction parallel to a transverse direction of the magnetic frame 210. Magnetic field arrangement structures of the longitudinal magnetic field coil group 231, 232 and the transverse magnetic field coil group 233, 234 can meet various control requirements of magnetic-field-assisted refrigeration, and a type of the magnetic field is more flexible.

The longitudinal magnetic field coil group 231, 232 and the transverse magnetic field coil group 233, 234 are controlled to be started or stopped by independent power supply switches respectively; that is, a first power supply switch 281 is configured to control power supply of the longitudinal magnetic field coil group 231, 232 to be switched on or off, and the longitudinal magnetic field coil group 231, 232 can generate the magnetic field when the first power supply switch is switched on; a second power supply switch 282 is configured to control power supply of the transverse magnetic field coil group 233, 234 to be switched on or off, and the transverse magnetic field coil group 233, 234 can generate the magnetic field when the second power supply switch is switched on.

In some embodiments, the magnetic frame 210 may be configured as a square cylinder having a through opening in a front-rear direction, i.e., a frame with a cross section shaped like a square with a small hollow square in the center. Each of a front end and a rear end of the square cylinder is provided with the through opening for arranging various types of storage boxes 240. The bosses 220 are formed on the inner sides of a top wall, a bottom wall, a left side wall and a right side wall of the magnetic frame 210 respectively. The bosses 220 are configured to be sleeved with the electromagnetic coils 230 respectively.

The longitudinal magnetic field coil group 231, 232 may include: a first coil 231 and a second coil 232. The first coil 231 is fitted over the boss 220 on the inner side of the top wall of the magnetic frame 210. The second coil 232 is fitted over the boss 220 on the inner side of the bottom wall of the magnetic frame 210, and the first coil 231 and the second coil 232 are connected in series or in parallel and controlled to be switched on or off by the first power supply switch 281.

The transverse magnetic field coil group 233, 234 may include: a third coil 233 and a fourth coil 234. The third coil 233 is fitted over the boss 220 on the inner side of the left side wall of the magnetic frame 210. The fourth coil 234 is fitted over the boss 220 on the inner side of the right side wall of the magnetic frame 210, and the third coil 233 and the fourth coil 234 are connected in series or in parallel and controlled to be switched on or off by the second power supply switch 282.

The magnetic field coils can work individually or in combination by controlling the first power supply switch 281 and the second power supply switch 282, so as to form various desired magnetic fields.

A cross section of the boss 220 may be square, circular or elliptical, and when a square cross section is used, the boss 220 can be more conveniently fitted with the cabinet 120 structurally. Inner circumferences of the coils 231, 232, 233 and 234 are fitted with outer circumferences of the corresponding bosses 220, and are correspondingly formed in a square, circular, or elliptical shape. In some embodiments, the first coil 231 and the second coil 232 have a mirrored arrangement; the third coil 233 and the fourth coil 234 have a mirrored arrangement.

Each of the electromagnetic coils 231, 232, 233 and 234 may be formed in a flat box shape, and circumferentially wound, such that the magnetic pole direction of the magnetic field generated after the electromagnetic coil 230 is energized is perpendicular to the boss 220. A height of the boss 220 may be fitted with a thickness of the electromagnetic coil 230, such that the inner walls of the frame shaped like a square with a small hollow square in the center where the electromagnetic coil 230 is located are substantially flush, so as to arrange the storage box 240. In some other embodiments, the electromagnetic coil 230 may be formed in a flat elliptical or circular ring shape.

Figure 6:
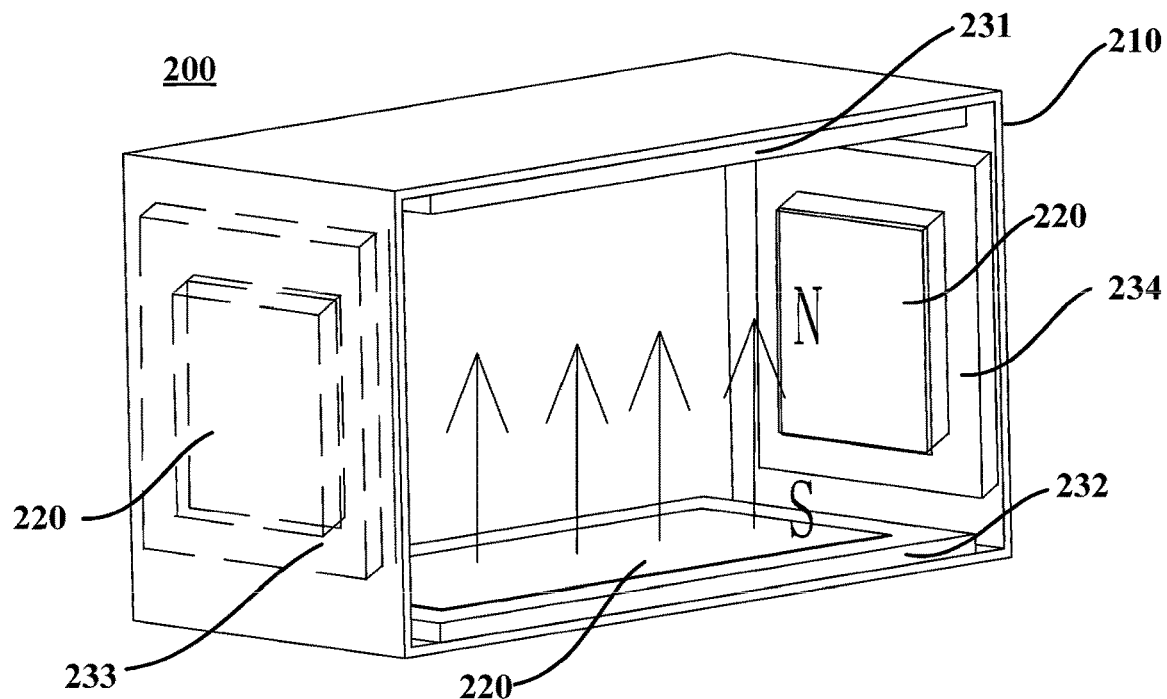
FIG. 6 is a schematic diagram of a magnetic field formed in a freezing storage assembly of a refrigerator with a freezing storage assembly according to an embodiment of the present invention.
Figure 7:
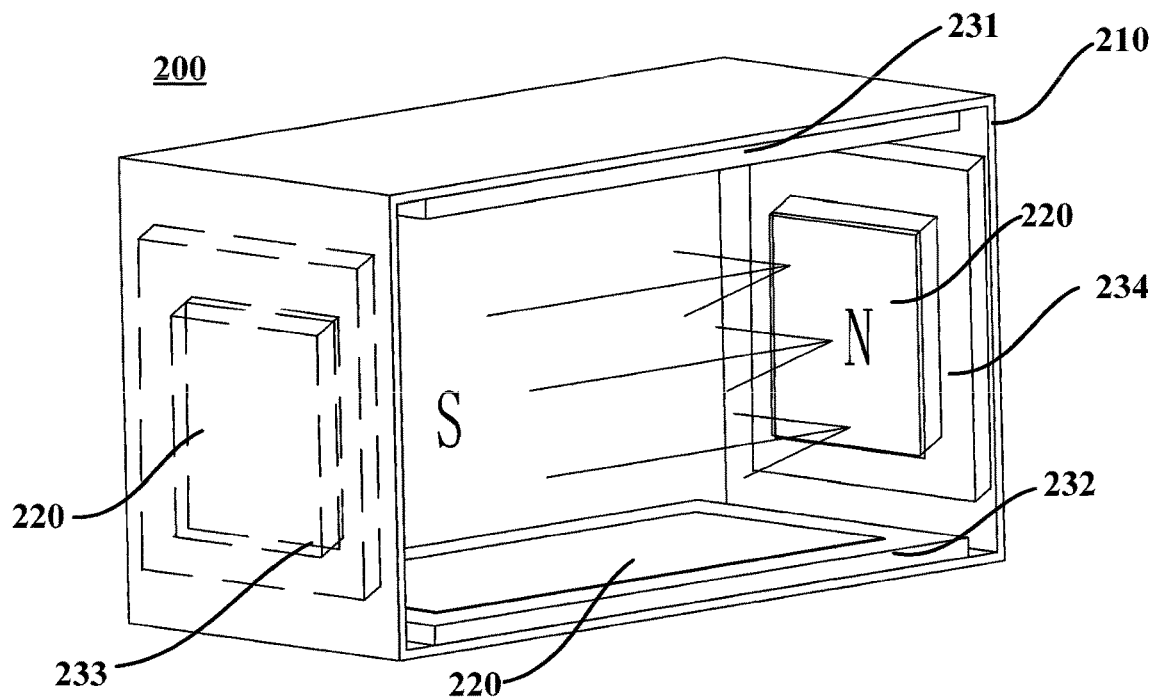
FIG. 7 is a schematic diagram of another magnetic field formed in a freezing storage assembly of a refrigerator with a freezing storage assembly according to an embodiment of the present invention.

Each of FIGS. 6 and 7 is a schematic diagram of a magnetic field formed in the freezing storage assembly of the refrigerator with a freezing storage assembly according to an embodiment of the present invention; the magnetic field of FIG. 6 is generated by the longitudinal magnetic field coil group 231, 232, the magnetic pole direction of the magnetic field formed by the first coil 231 and the second coil 232 is also set such that the magnetic lines are in the same direction (upward or downward), the magnetic field of FIG. 7 is generated by the transverse magnetic field coil group 233, 234, and the magnetic pole direction of the magnetic field formed by the third coil 233 and the fourth coil 234 is also set such that the magnetic lines are in the same direction (leftward or rightward). Each of the first power supply switch 281 and the second power supply switch 282 can change the magnetic pole direction by changing a direction of a current introduced into the coil. The magnetic lines of the magnetic field penetrate through an inner space of the magnetic frame 210 and then complete the closed loop through the magnetic frame 210, such that the magnetic field is uniformly distributed or the magnetization influence on the external components of the storage box 240 is reduced.

The magnetic frame 210 is configured to guide the magnetic field generated by the electromagnetic coil 230, so as to prevent the magnetic field from being uneven and influencing other components outside the storage box 240, and enable the electromagnetic coil 230 to form a uniform magnetic field with strength enough to meet a requirement of improving the freezing storage quality in the freezing storage space. Further, the magnetic frame 210 further provides an assembly structure for the electromagnetic coil 230, such that an occupied space is reduced, thereby improving practicability.

The storage box 240 may form an independent and sealed freezing storage space, thereby providing a better freezing storage environment for a specific food material. The storage box 240 is provided in a space enclosed by the magnetic frame 210.

The storage box 240 may include: an outer cylinder 241 and a drawer 242. The outer cylinder 241 is provided in the magnetic frame 210 and has a forward opening. The drawer 242 is provided in the outer cylinder 241 in a drawable mode. A front panel of the drawer 242 and the outer cylinder 241 may form a sealed structure. When the refrigerator 10 performs refrigeration by air cooling, an air inlet 243 and an air return port 244 are formed in a rear wall of the outer cylinder 241, the air inlet 243 is configured to be connected with an air supply port of an air duct of the refrigerator 10 or communicated with an evaporator of the refrigerator 10 (for example, communicated with a top region of the evaporator), so as to introduce refrigerating airflow into the storage box 240; the air return port 244 is configured to be connected with an air return port of the air duct of the refrigerator 10 or communicated with the evaporator of the refrigerator 10 (for example, communicated with a bottom region of the evaporator), so as to feed airflow after heat exchange back to an air return duct or evaporator of the refrigerator 10. In some embodiments, the air inlet 243 and the air return port 244 may be provided with dampers (not shown). The damper is controlled to be opened during refrigerating air supply. The air inlet 243 and the air return port 244 may be configured according to positions and structures of the air duct and the evaporator of the air-cooled refrigerator, and in some other embodiments, the air return port 244 may also be provided on a side wall of the outer cylinder 241.

Figure 8:
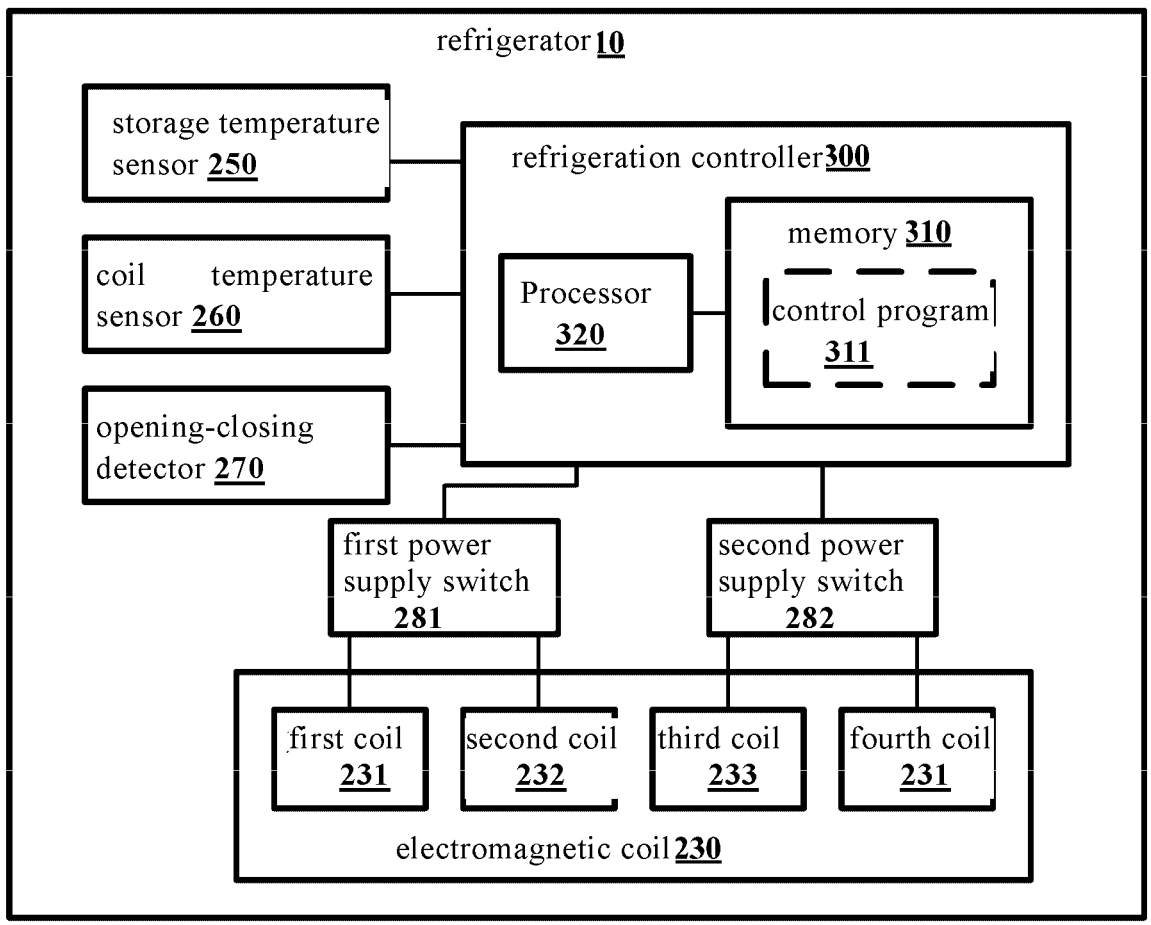
FIG. 8 is a block diagram of a control system of a refrigerator with a freezing storage assembly according to an embodiment of the present invention.

In the refrigerator 10 according to the present embodiment, control over the magnetic field of the electromagnetic coil 230 is combined with refrigeration control, so as to ensure that the food is frozen in the magnetic field environment, thereby achieving a freshness-retaining freezing effect. FIG. 8 is a block diagram of a control system of the refrigerator 10 with a freezing storage assembly 200 according to an embodiment of the present invention, and the refrigerator 10 is further provided with a storage temperature sensor 250, a coil temperature sensor 260, an opening-closing detector 270, and a refrigeration controller 300.

The storage temperature sensor 250 is provided in the outer cylinder 241 of the storage box 240 and configured to detect a temperature in the drawer 242. The coil temperature sensor 260 is provided close to the electromagnetic coil 230 and configured to detect a temperature at the electromagnetic coil 230, and in some embodiments, the coil temperature sensor 260 may be provided at the electromagnetic coil 230 at a bottom of the drawer 242. The opening-closing detector 270 is configured to detect an opening-closing state of the drawer 242.

When the electromagnetic coil 230 generates the magnetic field, heat is generated to some extent. Therefore, in order to prevent the heat of the electromagnetic coil 230 from affecting refrigeration, the electromagnetic coil 230 is further configured to de-energize when the temperature detected by the coil temperature sensor 260 exceeds a preset protection temperature, thereby realizing overheat protection.

The opening-closing detector 270 is configured to detect the opening-closing state of the drawer 242. After the drawer 242 is pulled to be open and then closed, whether a new food material is put in or whether an original food material is required to be re-frozen may be detected by means of the storage temperature sensor 250. Then, the electromagnetic coil 230 is fitted with the refrigeration system, such that magnetic-field-assisted freezing can be realized, and a freezing freshness-retaining effect of the food material is improved.

The refrigeration controller 300 includes a memory 310 and a processor 320. A control program 311 is stored in the memory 310, and when executed by the processor 320, the control program 311 is used to control the electromagnetic coil 230 and the refrigeration system, so as to implement a corresponding freezing control method. Various sensors provide detection means for magnetic field control, such that a control requirement of the control method can be met.

The refrigeration controller 300 may be configured to start refrigeration of the storage box 240 when a change in an internal temperature before the storage box 240 is opened and after the storage box 240 is closed is greater than a first set threshold. The change in the internal temperature of the storage box 240 reflects the state of the stored food, and a large change in the internal temperature indicates that new food is put into the storage box 240, or the temperature of the food is raised and the food is required to be re-frozen; a small change in the internal temperature indicates that the food may still be in a frozen state. When the change in the internal temperature is greater than the first set threshold, the refrigeration controller 300 starts freezing refrigeration of the storage box 240. The first set threshold can be set to 2 to 8 Celsius degrees, and can be flexibly set according to a freezing set temperature.

When the refrigeration controller 300 starts refrigeration of the storage box 240, the first power supply switch 281 and the second power supply switch 282 are alternately switched on according to a set period, such that the longitudinal magnetic field coil group 231, 232 and the transverse magnetic field coil group 233, 234 alternately generate the magnetic field. That is, during freezing refrigeration of the storage box 240, the direction of the magnetic field inside the storage box periodically alternates longitudinally and transversely. After practical verification, compared with a mode that a fixed direction of a magnetic field is reversed, the mode of alternately assisting freshness retaining freezing by the magnetic field realizes better freezing storage quality of the stored food and achieves a better sterilization effect. In addition, the starting condition can also avoid heating and an energy consumption increase caused by long-term formation of a magnetic field, and can also avoid the magnetization influence on other components outside the storage box 240.

In the process that the longitudinal magnetic field coil group 231, 232 and the transverse magnetic field coil group 233, 234 alternately generate the magnetic field, when the internal temperature of the storage box 240 is lowered to be less than a second set threshold, one of the first power supply switch 281 and the second power supply switch 282 is switched off, and the other one of the first power supply switch 281 and the second power supply switch 282 is switched on periodically or continuously, such that one of the longitudinal magnetic field coil group 231, 232 and the transverse magnetic field coil group 233, 234 generates the magnetic field. As the freezing process continues, the magnetic field required to assist freezing can be reduced, which can further reduce energy consumption. In some embodiments, when the internal temperature of the storage box 240 is lowered to the second set threshold, the first power supply switch 281 is switched off, and the second power supply switch 282 continues to be switched on, such that the longitudinal magnetic field coil group 231, 232 stops generating the magnetic field, and the transverse magnetic field coil group 233, 234 continues to work. The second set threshold may be set to −10 to 12 Celsius degrees, and in the temperature range, the stored food is mostly frozen.

When the internal temperature of the storage box 240 is continuously lowered to be less than a third set threshold, the first power supply switch 281 and the second power supply switch 282 are both switched off, and the third set threshold is less than the second set threshold, and may be set to −12 to −18 Celsius degrees, i.e., a temperature at which the stored food is substantially frozen;

then, when the internal temperature of the storage box 240 is continuously lowered to be less than a fourth set threshold, the refrigeration controller 300 stops refrigeration of the storage box 240, and the fourth set threshold is less than the third set threshold, may be set according to a set freezing shutdown temperature of the storage box 240, and may generally be lower than the set freezing shutdown temperature. That is, after the magnetic field coil finishes working, freezing refrigeration is stopped after a period of time. Since the refrigeration is performed after the storage box 240 is opened, the fourth set threshold is set to be lower, thereby realizing supercooling to some extent and improving the freezing storage quality.

When the electromagnetic coil 230 generates the magnetic field, heat is generated to some extent. Therefore, in order to prevent the heat of the electromagnetic coil 230 from affecting refrigeration, after the electromagnetic coil 230 is overheated, overheat protection can be realized through power failure.

A plurality of coil temperature sensors 260 are configured to detect the temperature of the longitudinal magnetic field coil group 231, 232 and the temperature of the transverse magnetic field coil group 233, 234 respectively, and corresponding temperature sensors may be provided at different sides of the magnetic frame 210.

In the process of alternately generating the magnetic field by the longitudinal magnetic field coil group 231, 232 and the transverse magnetic field coil group 233, 234, when the temperature of the longitudinal magnetic field coil group 231, 232 and/or the temperature of the transverse magnetic field coil group are/is abnormal, the first power supply switch 281 and the second power supply switch 282 are further configured to switch off power supply of the magnetic field coil with the abnormal temperature. For example, when the temperature at the first coil 231 is abnormal, the first power supply switch 281 is switched off, and when the temperature at the third coil 233 is abnormal, the second power supply switch 282 is switched off.

One solution for judging the temperature anomaly is as follows: when the temperature of any one of the first coil 231, the second coil 232, the third coil 233, and the fourth coil 234 exceeds a set protection temperature (for example, −2 to 0 degrees), the temperature of the corresponding coil is considered to be abnormal.

Another solution for judging the temperature anomaly is as follows: when a difference between the temperature of any one of the first coil 231, the second coil 232, the third coil 233, and the fourth coil 234 and the internal temperature of the storage box 240 is greater than a set protection temperature difference (for example, 2 to 4 degrees), the temperature of the corresponding coil is abnormal. Since the electromagnetic coil 230 is also located in the freezing storage compartment, the difference between the temperature at the electromagnetic coil 230 and the internal temperature of the storage box 240 can better reflect a heating condition of the electromagnetic coil 230, thus preventing the electromagnetic coil 230 from affecting normal refrigeration.

After stopping refrigeration of the storage box 240, the refrigeration controller 300 may be further configured to: perform conventional freezing control on the storage box 240 according to a refrigeration starting condition and a refrigeration stopping condition preset for the storage box 240, so as to maintain the freezing storage environment of the storage box 240; and the first power supply switch 281 and the second power supply switch 282 are further configured to allow the longitudinal magnetic field coil group 231, 232 and/or the transverse magnetic field coil group 233, 234 to generate the magnetic field according to a preset switching strategy during the conventional freezing control over the storage box 240 by the refrigeration controller 300.

After magnetic-field-assisted freezing refrigeration is completed, normal freezing control of the storage box 240 is recovered; that is, freezing control of the storage box 240 is performed according to the refrigeration starting condition and the refrigeration stopping condition preset for the storage box 240. The refrigeration starting condition and the refrigeration stopping condition can also be set according to the set temperature of the storage box 240, the refrigeration is started when the set temperature is higher than a refrigeration starting temperature, and refrigeration is stopped when the set temperature is lower than a refrigeration stopping temperature.

In the step of performing the freezing control on the storage box 240 according to the refrigeration starting condition and the refrigeration stopping condition preset for the storage box 240, magnetic-field-assisted refrigeration can be used, thus avoiding that the storage quality is reduced when parts of the ice crystals are regenerated. For example, the switching strategy of the first power supply switch 281 and the second power supply switch 282 may be as follows: the magnetic field is started or stopped while the refrigeration of the storage box 240 is started or stopped; that is, the magnetic field and the refrigeration are started or stopped simultaneously. Another alternative solution is as follows: the magnetic field is started when the refrigeration of the storage box 240 is started, and is stopped before the refrigeration of the storage box 240 is stopped; that is, the magnetic field is started only at an initial stage of the refrigeration. Through practical tests, the storage quality realized when the magnetic field is only started at the initial stage of the refrigeration is not obviously reduced compared with the storage quality realized when the magnetic field and the refrigeration are started or stopped simultaneously.

Another switching strategy of the first power supply switch 281 and the second power supply switch 282 in a long-term freezing process may be as follows: in the process of performing the freezing control on the storage box 240 according to the refrigeration starting condition and the refrigeration stopping condition preset for the storage box 240, the magnetic field is started according to a set period; that is, the magnetic field is started periodically.

In another embodiment, the longitudinal magnetic field coil group 231, 232 and the transverse magnetic field coil group 233, 234 alternately generate the magnetic field when the magnetic field is started for normal freezing control of the storage box 240; for example, the longitudinal magnetic field coil group 231, 232 and the transverse magnetic field coil group 233, 234 are started alternatively. The magnetic pole direction generated every time the coil is energized can be configured to be opposite to the magnetic pole direction generated after the coil is energized last time; for example, the magnetic pole direction is from top to bottom when the longitudinal magnetic field coil group 231, 232 is started for the first time, and from bottom to top when the longitudinal magnetic field coil group 231, 232 is started again; for another example, the magnetic pole direction is from left to right when the transverse magnetic field coil group 233, 234 is started for the first time, and from right to left when the transverse magnetic field coil group 233, 234 is started again. By the alternation of the magnetic pole direction, ice crystal generating conditions can be changed to a certain degree, and a better effect is achieved.

During an application to the air-cooled refrigerator, the step of starting refrigeration of the storage box 240 may include: opening the air inlet and starting blowing of the refrigerating airflow to the air inlet 243.

Figure 9:
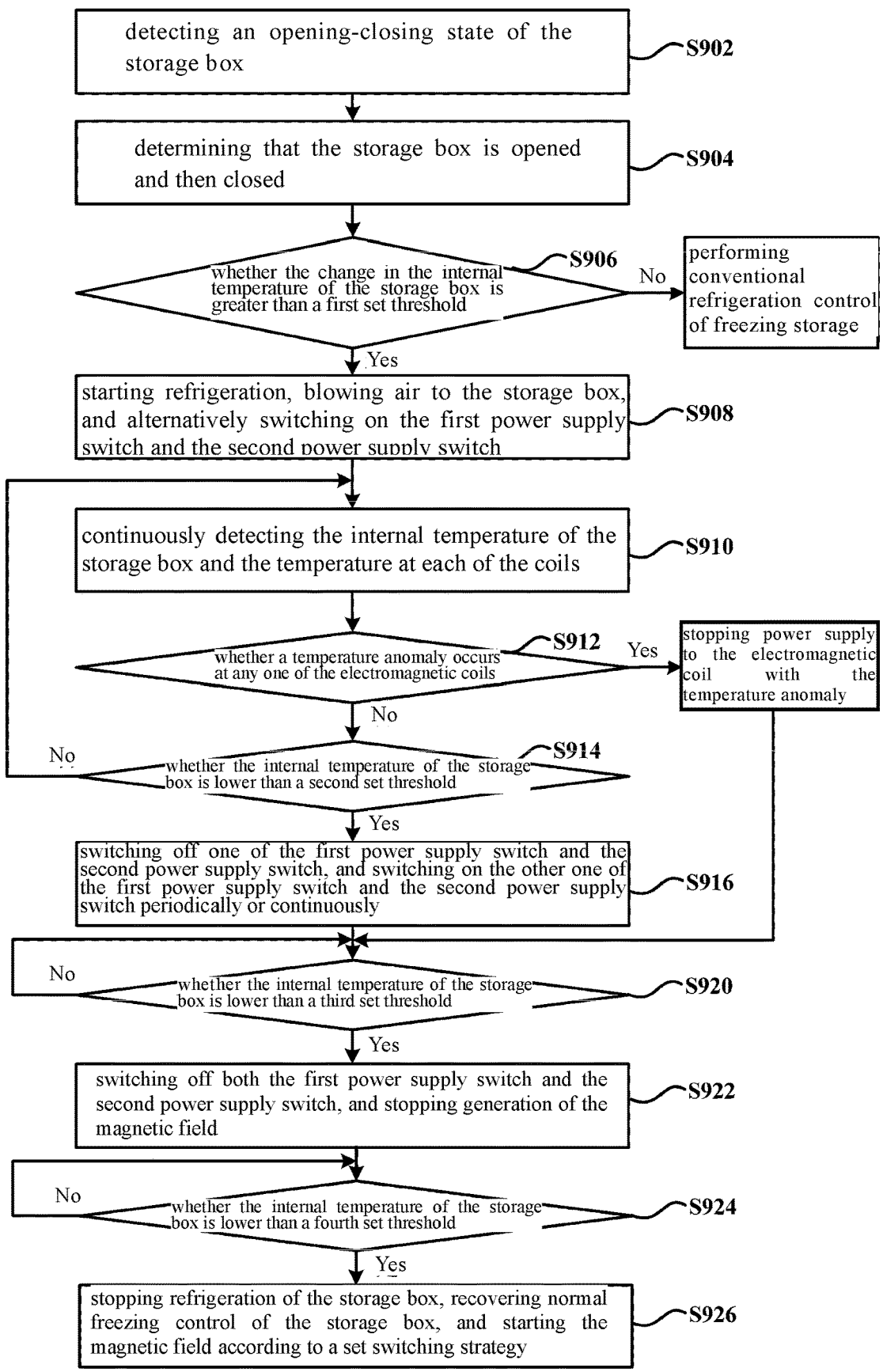
FIG. 9 is a schematic diagram of a freezing control method of a refrigerator with a freezing storage assembly according to an embodiment of the present invention.

FIG. 9 is a schematic diagram of a freezing control method of the refrigerator with a freezing storage assembly according to an embodiment of the present invention. The process of the present embodiment is a specific application example of the freezing control method of the refrigerator, in which an execution sequence of some steps can be adjusted. The process may include:

step S902: detecting an opening-closing state of the storage box 240;

step S904: determining that the storage box 240 is opened and then closed; that is, judging whether an opening-closing event occurs in the storage box 240;

step S906: obtaining a change in an internal temperature before the storage box 240 is opened and after the storage box 240 is closed, and judging whether the change in the internal temperature is greater than a first set threshold; that is, judging whether new food is put into the storage box 240 or whether a temperature of the food rises and the food is required to be refrozen, wherein the first set threshold may be set to 2 to 8 Celsius degrees; and when the change in the internal temperature is small and the food may not be required to be refrozen, performing conventional refrigeration control of freezing storage; that is, performing refrigeration control according to a set start-up temperature threshold and a set shutdown temperature threshold;

step S908: starting refrigeration, blowing air to the storage box 240, and meanwhile alternatively switching on the first power supply switch 281 and the second power supply switch 282 according to a set period, such that the longitudinal magnetic field coil group 231, 232 and the transverse magnetic field coil group 233, 234 alternately generate the magnetic field;

step S910: continuously detecting the internal temperature of the storage box 240 and the temperature at each of the electromagnetic coils 231, 232, 233 and 234;

step S912: judging whether a temperature anomaly occurs at any one of the electromagnetic coils 231, 232, 233 and 234; that is, judging whether heating of the coil influences normal refrigeration. One solution for judging the temperature anomaly is as follows: when the temperature of any one of the first coil 231, the second coil 232, the third coil 233, and the fourth coil 234 exceeds a set protection temperature (for example, −2 to 0 degrees), the temperature of the corresponding coil is considered to be abnormal; or when a difference between the temperature of any one of the first coil 231, the second coil 232, the third coil 233, and the fourth coil 234 and the internal temperature of the storage box 240 is greater than a set protection temperature difference (for example, 2 to 4 degrees), the temperature of the corresponding coil is abnormal. The first power supply switch 281 and the second power supply switch 282 disconnect power supply of the magnetic field coil with the temperature anomaly when the temperature anomaly occurs.

Step S914: judging whether the internal temperature of the storage box 240 is lower than a second set threshold (for example, may be set to −10 to 12 Celsius degrees); that is, judging whether a basic freezing stage is completed;

step S916: switching off one of the first power supply switch 281 and the second power supply switch 282, and switching on the other one of the first power supply switch 281 and the second power supply switch 282 periodically or continuously, such that one of the longitudinal magnetic field coil group 231,232 and the transverse magnetic field coil group 233,234 generates a magnetic field;

step S920: determining that the internal temperature of the storage box 240 is lower than a third set threshold, wherein the third set threshold is less than the second set threshold, and may be set to −12 to −18 Celsius degrees, i.e., a temperature at which the stored food is substantially frozen;

step S922: switching off both the first power supply switch 281 and the second power supply switch 282, and stopping generation of the magnetic field;

step S924: judging whether the internal temperature of the storage box 240 is lower than a fourth set threshold, wherein the fourth set threshold is less than the third set threshold, may be set according to a set freezing shutdown temperature of the storage box 240, and may generally be lower than the set freezing shutdown temperature;

step S926: stopping refrigeration of the storage box 240, and performing conventional freezing control on the storage box 240 according to a refrigeration starting condition and a refrigeration stopping condition preset for the storage box 240, so as to maintain a freezing storage environment of the storage box 240, wherein the first power supply switch 281 and the second power supply switch 282 are further configured to allow the longitudinal magnetic field coil group 231, 232 and/or the transverse magnetic field coil group 233, 234 to generate the magnetic field according to a preset switching strategy during the conventional freezing control over the storage box 240 by the refrigeration controller 300.

With the refrigerator 10 with a freezing storage assembly according to the present embodiment, the food material is frozen in the magnetic field environment, the direction, starting and stopping of the magnetic field are subjected to targeted control, growth of ice crystal nuclei is preferentially suppressed, damage to cells is reduced, water loss is avoided, a better taste of the food material is guaranteed, the freezing storage quality is improved, and a requirement of a user for storage quality of a precious food material is met.

So far, it should be appreciated by those skilled in the art that while various exemplary embodiments of the invention have been shown and described in detail herein, many other variations or modifications which are consistent with the principles of this invention may be determined or derived directly from the disclosure of the present invention without departing from the spirit and scope of the invention. Accordingly, the scope of the invention should be understood and interpreted to cover all such other variations or modifications.

What is claimed is:

1. A refrigerator with a freezing storage assembly, comprising:
   a cabinet provided therein with a storage compartment for achieving a freezing storage function;
   the freezing storage assembly arranged in the storage compartment and comprising:
   a magnetic frame made of a magnetic material; and
   a storage box provided in a space enclosed by the magnetic frame and defining a freezing storage space; and
   a plurality of groups of electromagnetic coils arranged on an inner surface of the magnetic frame and configured to form magnetic fields with magnetic pole directions at a set angle in the freezing storage space, the magnetic fields passing through the magnetic frame to complete closed loops of magnetic lines;
   wherein the magnetic frame is configured as a square cylinder having a through opening in a front-rear direction; and
   the plurality of groups of electromagnetic coils comprise:
   a longitudinal magnetic field coil group configured to form a magnetic field with the magnetic pole direction parallel to a longitudinal direction of the magnetic frame; and
   a transverse magnetic field coil group configured to form a magnetic field with the magnetic pole direction parallel to a transverse direction of the magnetic frame; and the refrigerator further comprises:
   a first power supply switch configured to control power supply of the longitudinal magnetic field coil group to be switched on or off; and
   a second power supply switch configured to control power supply of the transverse magnetic field coil group to be switched on or off.

2. The refrigerator with a freezing storage assembly according to claim 1, wherein:
   bosses are formed on inner sides of a top wall, a bottom wall, a left side wall and a right side wall of the magnetic frame respectively;
   the longitudinal magnetic field coil group comprises:
   a first coil fitted over the boss on the inner side of the top wall of the magnetic frame; and
   a second coil fitted over the boss on the inner side of the bottom wall of the magnetic frame, the first coil and the second coil being connected in series or in parallel; and the transverse magnetic field coil group comprises:
a third coil fitted over the boss on the inner side of the left side wall of the magnetic frame; and
a fourth coil fitted over the boss on the inner side of the right side wall of the magnetic frame, the third coil and the fourth coil being connected in series or in parallel.

3. The refrigerator with a freezing storage assembly according to claim 1, wherein the storage box comprises:
an outer cylinder provided in the space enclosed by the magnetic frame and provided with a forward opening; and
a drawer provided in the outer cylinder in a drawable mode.

4. The refrigerator with a freezing storage assembly according to claim 3, wherein:
an air inlet and an air return port are formed in a rear wall of the outer cylinder; and
the air inlet is configured to be connected with an air supply duct of the refrigerator or communicated with an evaporator of the refrigerator, so as to introduce refrigerating airflow into the storage box;
the air return port is configured to be connected with an air return duct of the refrigerator or communicated with the evaporator of the refrigerator, so as to feed airflow after heat exchange back to the air return duct or the evaporator of the refrigerator.

5. The refrigerator with a freezing storage assembly according to claim 1, further comprising:
an opening-closing sensor configured to detect an opening-closing state of the storage box;
a storage temperature sensor provided in the storage box and configured to detect a temperature in the storage box; and
a refrigeration controller configured to start refrigeration of the storage box under a condition that a change in the internal temperature before the storage box is opened and after the storage box is closed is greater than a first set threshold; and
the first power supply switch and the second power supply switch being further configured to be switched on one after the other according to a set period when the refrigeration controller starts refrigeration of the storage box, such that the longitudinal magnetic field coil group and the transverse magnetic field coil group generate the magnetic field in sequence.

6. The refrigerator with a freezing storage assembly according to claim 5, wherein:
in the process that the longitudinal magnetic field coil group and the transverse magnetic field coil group sequentially generate the magnetic field, when the internal temperature of the storage box is lowered to be less than a second set threshold, one of the first power supply switch and the second power supply switch is switched off, and the other one of the first power supply switch and the second power supply switch is switched on periodically or continuously, such that one of the longitudinal magnetic field coil group and the transverse magnetic field coil group generates the magnetic field.

7. The refrigerator with a freezing storage assembly according to claim 6, wherein:
when the internal temperature of the storage box is continuously lowered to be less than a third set threshold, the first power supply switch and the second power supply switch are both switched off, and the third set threshold is less than the second set threshold;
when the internal temperature of the storage box is continuously lowered to be less than a fourth set threshold, the refrigeration controller stops refrigeration of the storage box, and the fourth set threshold is less than the third set threshold.

8. The refrigerator with a freezing storage assembly according to claim 7, wherein:
after refrigeration of the storage box is stopped, the refrigeration controller is further configured to perform a freezing control on the storage box according to a refrigeration starting condition and a refrigeration stopping condition preset for the storage box, so as to maintain a freezing storage environment of the storage box; and
the first power supply switch and the second power supply switch are further configured to allow the longitudinal magnetic field coil group or the transverse magnetic field coil group to generate the magnetic field according to a preset switching strategy during the freezing control over the storage box by the refrigeration controller.

9. The refrigerator with a freezing storage assembly according to claim 5, further comprising:
a plurality of coil temperature sensors configured to detect a temperature of the longitudinal magnetic field coil group and a temperature of the transverse magnetic field coil group respectively; and
in the process that the longitudinal magnetic field coil group and the transverse magnetic field coil group sequentially generate the magnetic field, when the temperature of the longitudinal magnetic field coil group or the temperature of the transverse magnetic field coil group are/is abnormal, the first power supply switch and the second power supply switch are further configured to disconnect power supply of the magnetic field coil with the abnormal temperature.

* * * * *